Jan. 14, 1964 P. H. TAYLOR 3,117,397
HONING APPARATUS AND WORKHOLDER
Filed Oct. 13, 1961 6 Sheets-Sheet 2

INVENTOR.
Paul H. Taylor
BY Popp and Sommer
Attorneys

INVENTOR.
Paul H. Taylor
BY
Popp and Sommer
Attorneys

Jan. 14, 1964 P. H. TAYLOR 3,117,397
HONING APPARATUS AND WORKHOLDER
Filed Oct. 13, 1961 6 Sheets-Sheet 4

INVENTOR.
Paul H. Taylor
BY Pope and Sommer
Attorneys

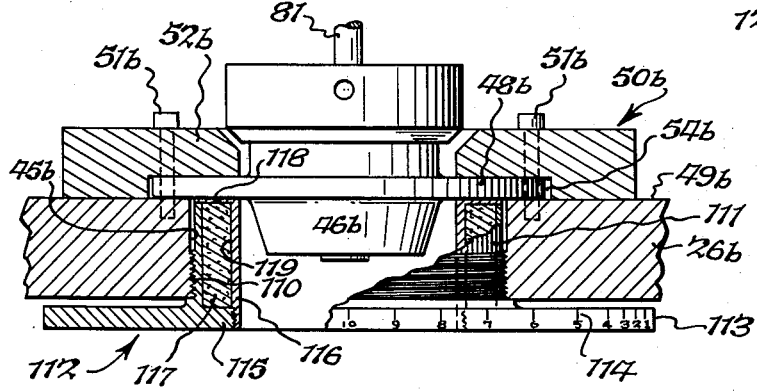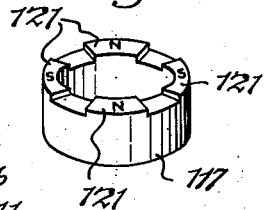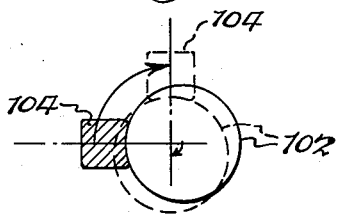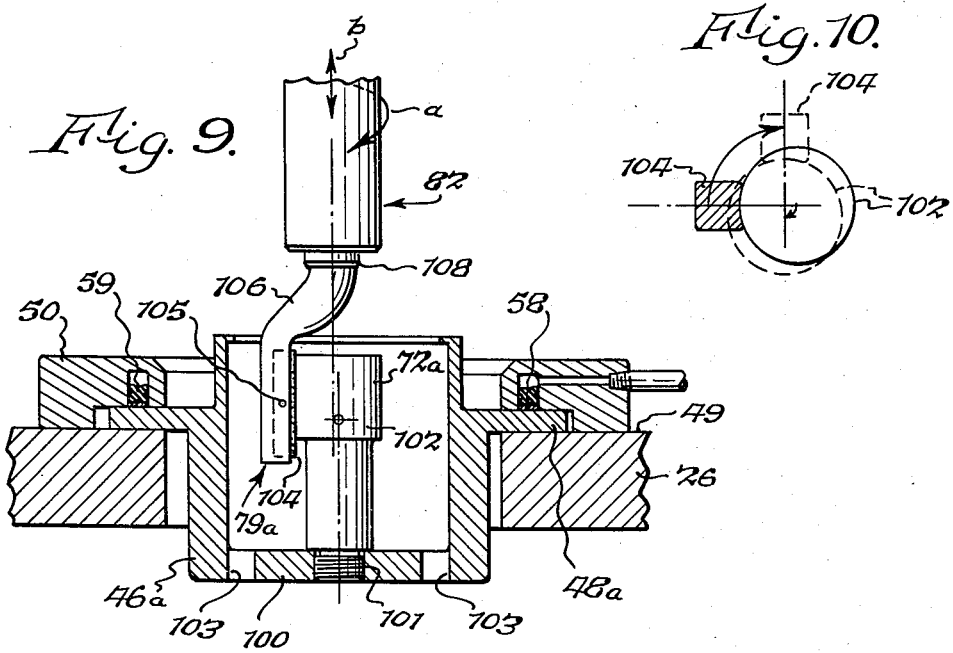

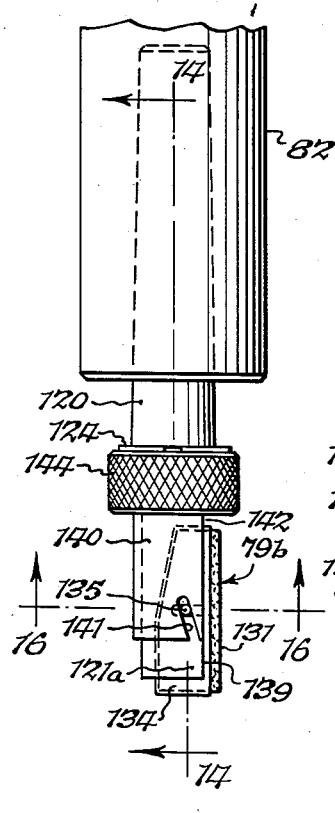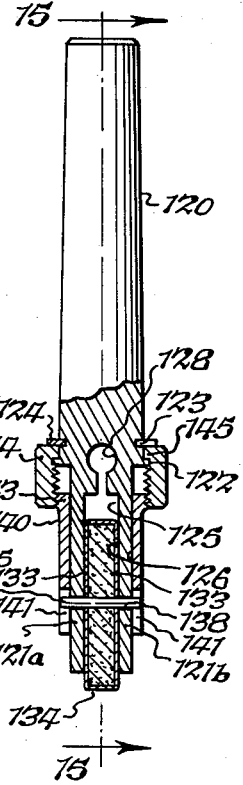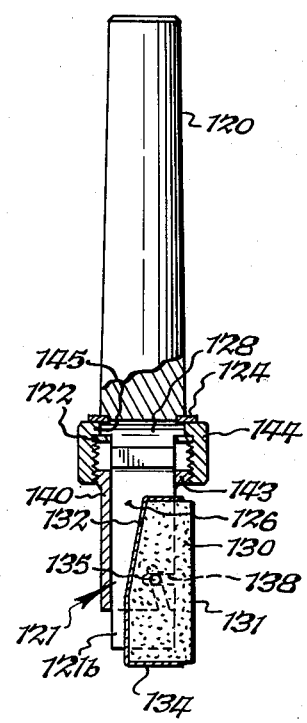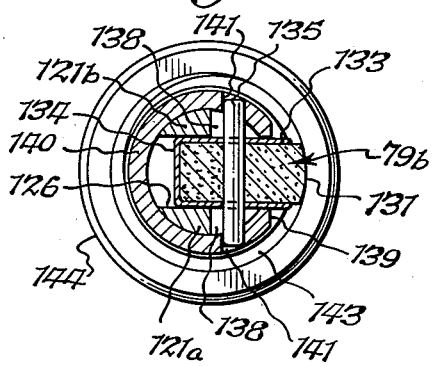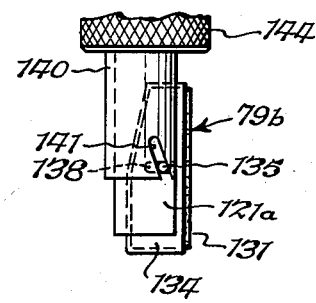

United States Patent Office 3,117,397
Patented Jan. 14, 1964

3,117,397
HONING APPARATUS AND WORKHOLDER
Paul H. Taylor, Grand Island, N.Y., assignor to Tayco Developments, Inc., North Tonawanda, N.Y., a corporation of New York
Filed Oct. 13, 1961, Ser. No. 144,905
11 Claims. (Cl. 51—48)

This invention relates to a honing apparatus and more particularly to internal and external honing to microfinishes, that is tolerances within one or a few millionths of an inch.

A principal object of the present invention is to obtain an exact and constant optimum pressure between the workpiece and the working face of the tool, too heavy a pressure resulting in scratching and irregular cutting and too light a pressure resulting in no honing work being done. With available equipment for honing to such microfinishes the tendency is either to dig into the workpiece with resultant scratching or gouging damage, or to have inadequate pressure to cut.

Another object is to provide such accurately controlled contact pressure which can be provided by common, readily available and rugged instruments, such as air pressure valves, the effect of such crude control devices being modified to provide the exactness required for microfinishes.

Another object is to provide such a honing machine which is readily adapted for two stage honing first with a relatively coarse abrasive and thereafter with a finer abrasive.

Another object is to provide such a honing mechanism which will retain such exact control with such coarse control instrumentalities for long runs of service without requiring readjustment.

Another object is to provide such a honing machine in which no adjustment of the tool is required to establish and maintain working pressure, adjustments of the tool being only as to speeds of rotation or reciprocation.

Another object is to provide such a honing apparatus in which the restraint required to establish the working pressure can be applied either frictionally by inertia or magnetically.

Another object is to provide such a honing apparatus which is adapted to different forms of tools and different honing requirements.

Other objects and advantages of the invention will be apparent from the following description and drawings in which:

FIG. 9 is a view similar to FIG. 5 and showing a modified form of chuck and honing tool adapted for external use on the workpiece.

FIG. 10 is a diagrammatical representation of the movement of the tool and workpiece with reference to the honing apparatus with the form of the invention illustrated in FIG. 9.

FIG. 11 is a fragmentary view similar to FIG. 5 but showing a modification of the invention in which the movement of the chuck is magnetically restrained instead of frictionally as with the form of the invention shown in FIGS. 1 through 8.

FIG. 12 is a perspective view of the permanent magnet used in the form of the invention shown in FIG. 9.

FIG. 13 is a side elevational view of a modified form of tool.

FIG. 14 is a vertical section taken generally on line 14—14, FIG. 13.

FIG. 15 is a vertical section taken generally on line 15—15, FIG. 14.

FIG. 16 is an enlarged horizontal section taken generally on line 16—16, FIG. 13.

FIG. 17 is a fragmentary view similar to FIG. 13 but showing that wear of the block has taken place and that the position of the block has been adjusted to compensate for this.

Figure 1:
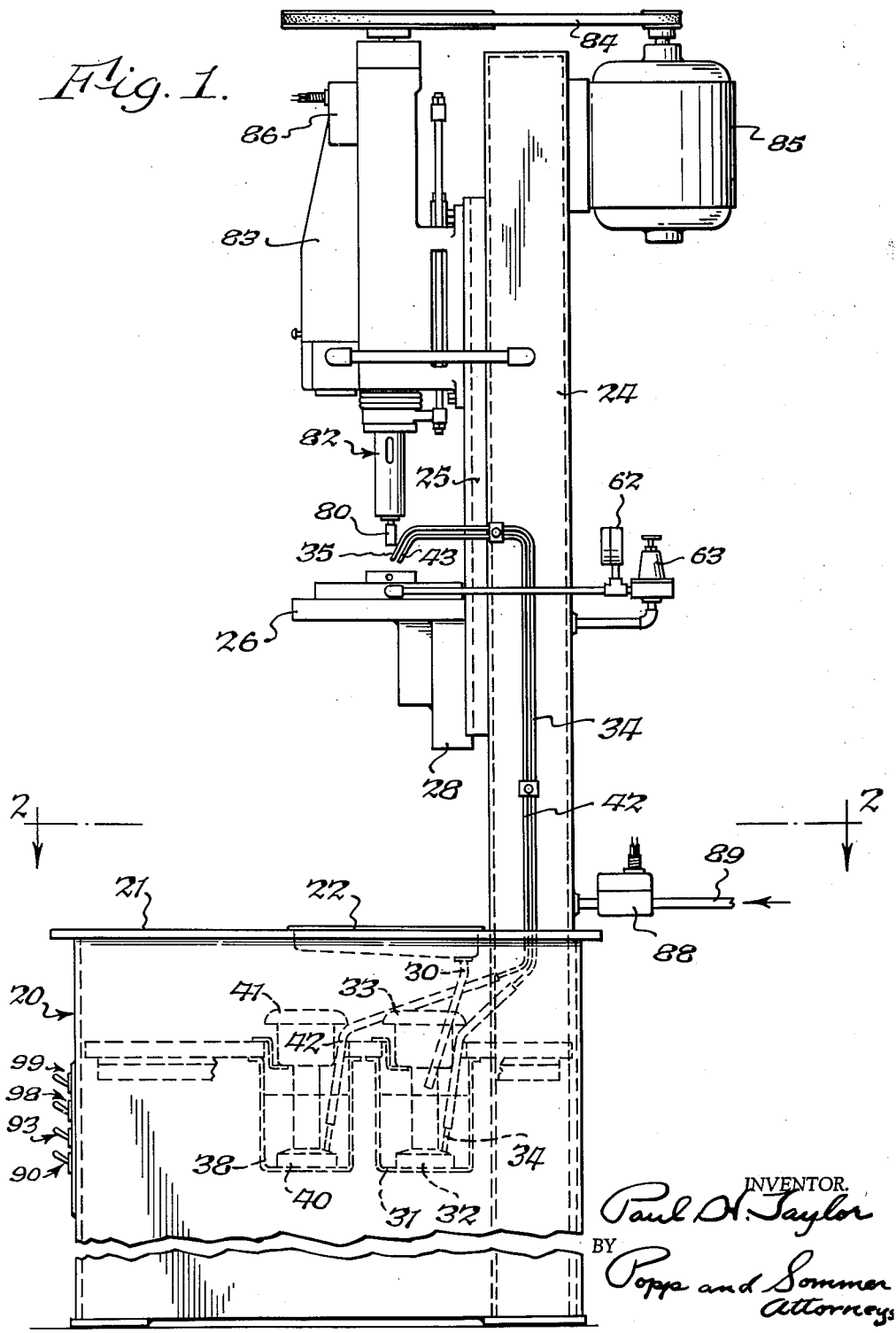
FIG. 1 is a fragmentary side elevational view of honing apparatus embodying and adapted to carry out the present invention.

The honing apparatus embodying and adapted to carry out the present invention is shown in FIGS. 1–8 as comprising a box-like base or table indicated generally at 20 having rectangular side walls and a rectangular table top 21 in turn having a rectangular opening in which either a pan 22 or 23 can be set, the rim of either of these pans resting on the table top and the body of these pans being contained within the base or table 21. The frame of the honing apparatus also includes a column 24 fixed to and rising from the rear end of the base or table 20 and having a vertical slideway support 25 fast to its forward face. To the lower end of this slideway support is fixed, in any suitable manner, the holder 26 for the workpiece, this holder being shown as being in the form of a horizontal plate or block having a depending leg portion 28 secured in the slideway support 25 for adjustment up and down in any suitable manner (not shown).

Figure 2:
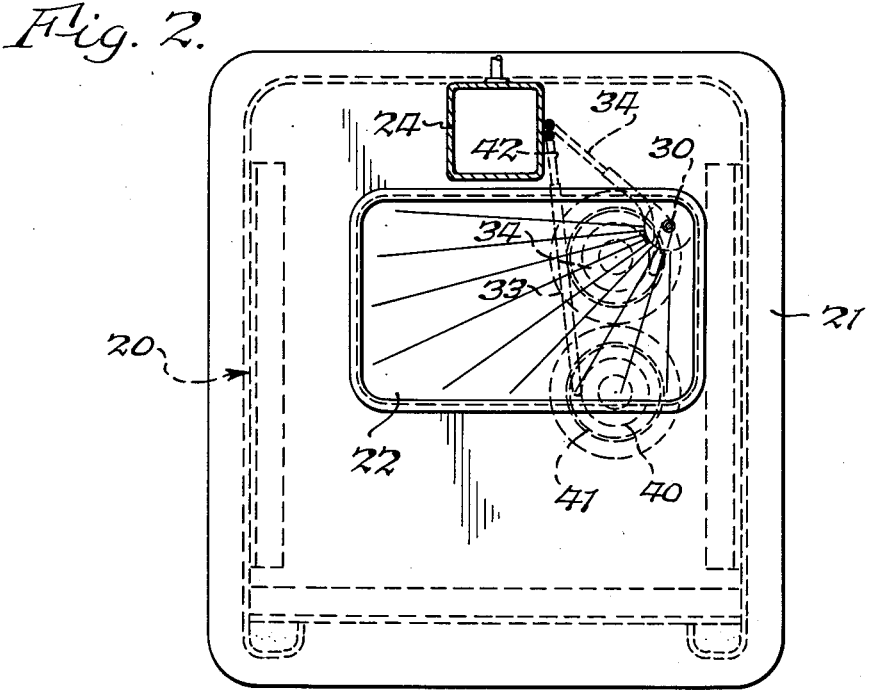
FIG. 2 is a horizontal section taken generally on line 2—2, FIG. 1, and showing the pan used when a coarse abrasive in a liquid is being employed.

In the form of the invention shown in FIGS. 1–8, the honing is effected by supplying a stream of abrasive particles, such as diamond dust, contained in a liquid, against the honing tool and workpiece, this stream of liquid and abrasive particles being in the form of a very thin or watery slurry. During the initial part of the honing operation it is desirable to use coarse abrasive particles in order to produce rapid honing action. During this initial honing phase, the pan 22 shown in FIG. 2 is employed and it will particularly be noted that the bottom of this plan slants to drain toward a depending drain pipe 30 at the upper right of this pan as viewed in FIG. 2, this tube discharging into a sump 31 within the base or table 20 and which is served by a recirculating pump 32. The pump 32 is driven by an electric motor 33. The outlet line 34 from this pump extends upwardly and is secured to the column 24 and terminates in a downwardly directed outlet end or nozzle 35 which is directed toward the center of the workpiece holder 26.

Figure 3:
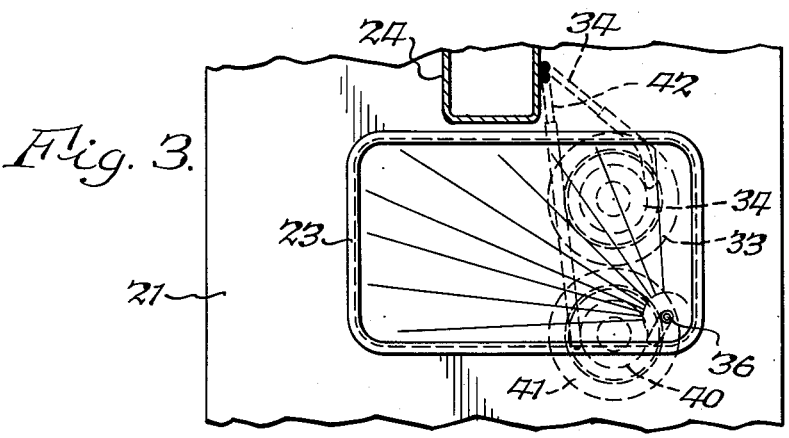
FIG. 3 is a fragmentary view similar to FIG. 2 but showing the pan used when a fine abrasive in a liquid is being employed.

For finishing, fine abrasive particles as a thin watery slurry is employed and during this phase of the operation, the pan 23 shown in FIG. 3 is substituted for the pan 22. It will be noted that the bottom of this pan 23 slopes toward a depending outlet pipe 36 in the lower right of this pan as viewed in FIG. 3, this being in contrast to the location of the corresponding pipe 30 in the upper right of the pan 23 as viewed in FIG. 2. The pipe 36 discharges into a sump 38 contained within the base or table 20 and served by a recirculating pump 40. The pump is driven by a motor 41. The discharge line 42 of the pump 40 extends upwardly alongside the line 34 and terminates in a downwardly directed end or nozzle 43 alongside the nozzle 35 of the line 34.

Figure 4:
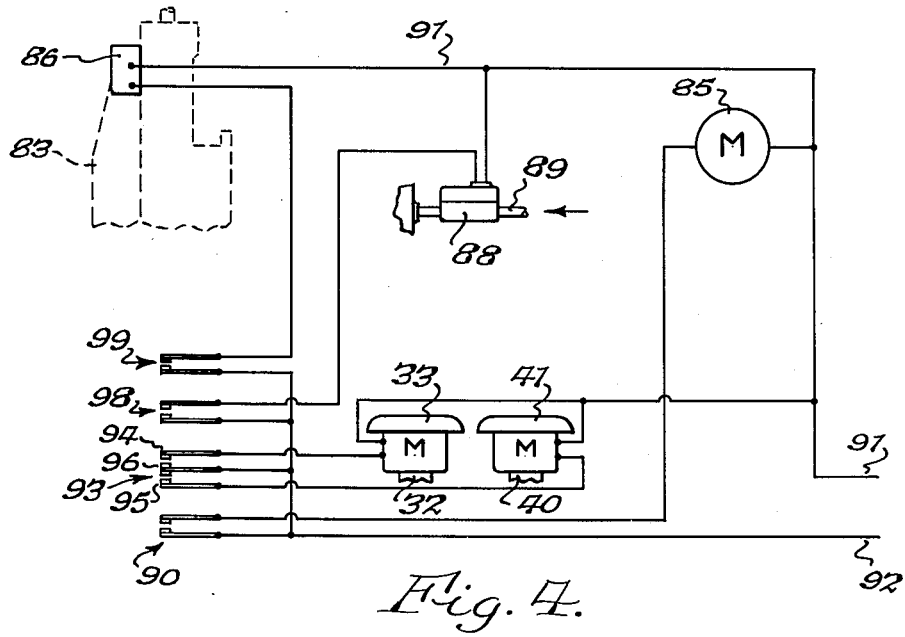
FIG. 4 is a diagram of the electrical components.
Figure 5:
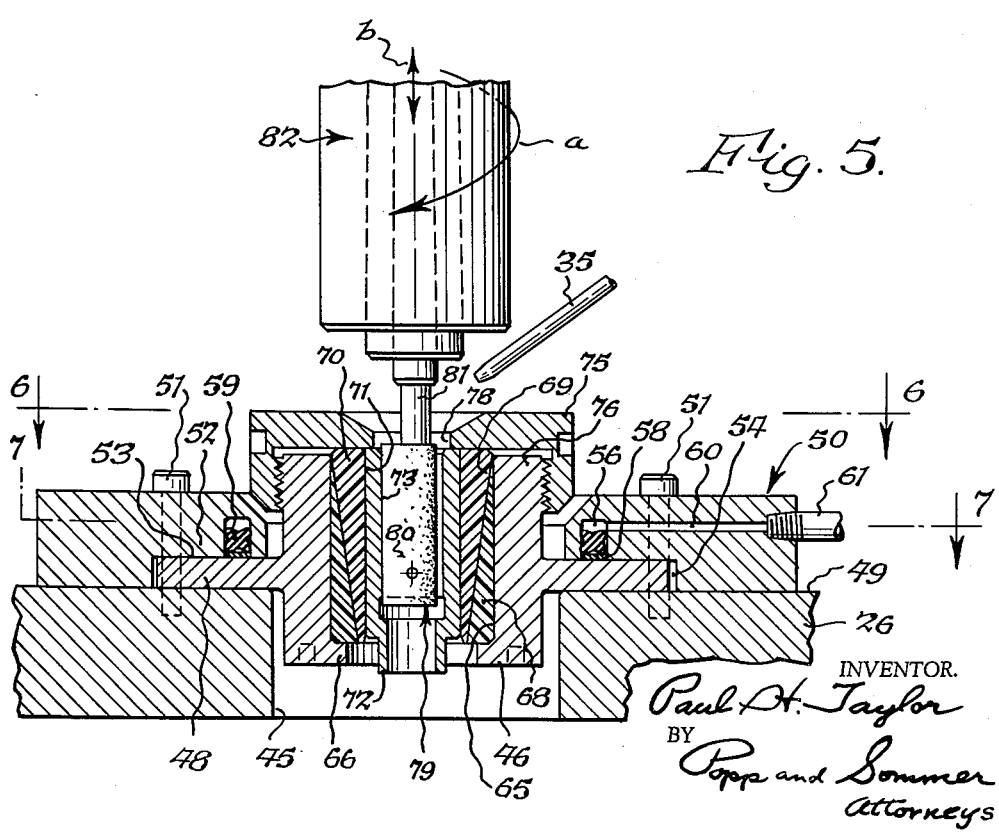
FIG. 5 is an enlarged vertical central section through the holder and chuck for the workpiece and showing the same being honed.
Figure 6:
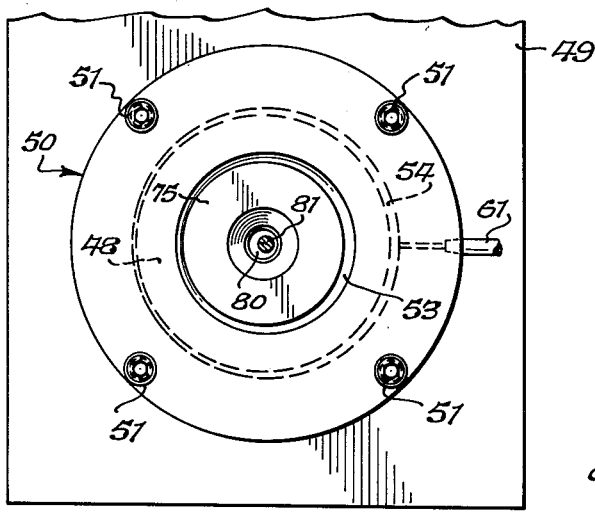
FIGS. 6 and 7 are fragmentary horizontal sections taken on the correspondingly numbered lines of FIG. 5.

The workpiece holder in the form of a horizontal plate or block 26 carried by the column 24 has a central vertical opening 45 therethrough which contains the lower end of a tubular chuck 46 as best shown in FIG. 5. A feature of the invention resides in the provision of an outwardly extending horizontal annular flange 48 on this tubular chuck 46 and which frictionally engages the top face 49 of the workpiece holder 26 so that the chuck 46 is capable of orbital movement in a horizontal plane, this movement, in the form of the invention shown in FIGS. 1–8, being resisted by the friction of the top face 49 of the workpiece holder 26. It is a feature of the invention to adjust the value of this frictional resistance of the top face 49 of the workpiece holder 26 and to this end a retaining ring 50 surrounds the flange 48 and is secured to the top 49 of the workpiece holder 26 by screws 51 or in any other suitable manner. This ring is provided with a radial inward extension 52 which overhangs or overlays the flange 48 and has an under face in closely spaced relation to the top face 53 of the flange 48, clearance 54 being left around the periphery of this flange 48 to permit unobstructed orbital movement thereof. The central part 52 of the ring 50 so overlaying the flange 48 is provided in its underside with a downwardly opening concentric channel 56 containing a washer-like follower 58 backed by a quad-ring 59 of soft resilient flexible material. Above this quad-ring the annular channel 56 communicates, via a duct 60, with an air pressure line 61 having a gage 62 and controlled by an adjustable pressure reducing valve 63. It will be seen that by adjusting the valve 63 increasing air pressure can be applied against the top side of the quad-ring 59 thereby to increase the frictional resistance to the orbital movement of the chuck 46, this frictional resistance being essentially provided by the top face 49 of the workpiece holder 26, it being desirable to minimize any friction provided by the follower 58 which is preferably of small area and adequately lubricated for this purpose.

The chuck 46 is shown as provided with a vertical stepped through bore 65 providing a bottom step or seat 66 of reduced diameter supporting a cylinder 68 of nylon or the like fitted in the enlarged upper part of the through bore 65. This nylon cylinder has a conical through bore 69 diminishing toward the bottom of the cylinder in which is fitted a conical frustum 70 also preferably made of nylon or other resilient plastic material. The frustum 70 is shown as having a cylindrical bore 71 fitting the periphery of the workpiece 72 which is shown as being of cylindrical form and as having a cylindrical bore 73 which is to be honed. The workpiece, together with the nylon cylinder 68 and the nylon frustum 70 are located in the chuck 46 by a screw cap 75 having threaded engagement with the upper threaded end 76 of the chuck 46 and bearing downwardly against the upper ends of the workpiece 72 and nylon frustum 70 as best shown in FIG. 5. The screw cap 75 has a central opening 78 through which the honing tool 79 rotates and reciprocates in performing the honing operation of the apparatus. The nozzles 35 and 43 supply coarse and fine abrasive particles to the honing tool 79 and are directed toward the opening 78.

The tool 79 is shown as being in the form of a cylinder 80 fixed eccentrically to the lower end of a stem 81 which is in turn removably fixed concentrically in the lower end of a spindle 82. The cylinder 80 can be of any material which will coact with the thin watery slurry of abrasive particles from the nozzles 35 or 43 in honing and finishing the bore 73 of the workpiece, such as Teflon, rubber, carbon, felt, nylon or abrasive material. This spindle 82 is mounted in a housing 83 which is preferably mounted on the slideway support 25 so that it can be set at different elevations and the spindle and its housing are of the commercially available type having both rotary and axial reciprocatory movement as indicated by the arrows a and b, FIG. 5, and both of these movements being adjustable. The spindle 82 is shown as driven through a belt drive 84 from an electrical motor 85 fixed to the top of the column 24. Preferably the reciprocation of the spindle 82 is under control of a start and stop switch 86 and the air supply to the apparatus is under control of a solenoid valve 88 in the air supply line 89.

Referring to the wiring diagram, FIG. 4, a manual switch 90 is in series with the drive motor 85 and the two sides 91 and 92 of the main power line. This motor drives the spindle 82. A manual switch 93 has two fixed contacts 94, 95 alternately placed in series with the motors 33 and 41 and the two sides 91 and 92 of the main power line by a movable contact 96. This selectively operates the pump 38 for the coarse grain abrasive slurry on the pump 32 for the fine grain abrasive slurry. A manual switch 98 is in series with the solenoid valve 88 and the two sides 91 and 92 of the main power line. This cuts in or cuts out the air supply to the apparatus. A manual switch 99 is in series with the controller 86 and the two sides 91 and 92 of the main power line. This starts or stops reciprocation of the spindle 82.

In the operation of the form of the invention shown in FIGS. 1–8, the workpiece 72 is locked in the chuck 46 and for this purpose the screw cap 75 is first removed from the upper end of this chuck and the workpiece placed in the bore 71 of the nylon frustum 70. The screw cap 75 is then replaced and tightened down, the cap bearing downwardly on the upper end of the workpiece 72 and this nylon frustum 70. This forces the nylon frustum downwardly into the conforming conical bore 69 of the nylon cylinder 68 thereby to contract the nylon frustum 70 radially and cause it to exert radial inward pressure on the workpiece 72. It will particularly be noted that in this action of locking the workpiece 72 in the chuck, the nylon sleeves 68, 70 exert a uniform radial inward pressure on the workpiece throughout the circumference of the workpiece. This is in distinct contrast to conventional chucks having a plurality of radially moving jaws where, with micro-finishes, it was found that each jaw would distort the adjacent part of the wall of the workpiece radially inwardly a distance sufficient to result in a measurable channel or depression in the bore of the workpiece when released from the chuck even though when contained in the chuck the bore had been finished to an exact cylinder.

The switch 98 can then be closed to energize the solenoid valve 85 and supply compressed air to the apparatus. The manual valve 63 can then be adjusted to provide the required air pressure in line 61, as indicated by the gage 62, this air pressure being impressed against the quad-ring, FIG. 5, thereby through the follower ring 58, impressing a downward pressure on the horizontal flange 48 of the tubular chuck 46. This downward pressure adjusts to the required value the friction between the bottom of this flange and the top face 49 of the workpiece holder 26 to provide the required resistance or impedance to the orbital movement of the chuck 46 by the tool 79 as hereinafter described.

The operator then actuates the switch 96 to, say close its contacts 94 and 96 and energize the motor 33 for the fine abrasive pump 32. Accordingly the watery slurry containing the coarse diamond dust particles is withdrawn from the sump 31 by this pump and discharged through the line 34 and nozzle 35 against the workpiece 72 in the chuck 46 as illustrated in FIG. 5. This slurry flows down through the workpiece, contributing to the honing action of the tool 79 and falls to the pan 22 from which it returns, via the drain pipe 30, to the sump 31 for recirculation by the pump 32.

The operator then closes the switches 90 and 99 to energize the motor 85 and to effect reciprocatory movement of the spindle 82 in addition to its rotary movement. This rotates and reciprocates the tool 79 as indicated by the arrows a and b, FIG. 5. Both of these motions produces a honing action of the tool against the bore 73 of the workpiece, this being due to the movement of the longitudinal surface of the tool in contact with the bore surface 73 in conjunction with the stream of thin watery abrasive slurry being supplied between these surfaces. An important feature of the invention, however, lies in the fact that the pressure of this contact is due to the frictional resistance to the horizontal movement of the flange 48 of the chuck 46 and that the eccentric relation of the tool 79 to the workpiece 72 drives or moves the tool and its chuck 46 against this resistance. Thus, the friction of the surface 80 of the tool 79 against the bore 73 not only rotates the workpiece 72 and its chuck 46, but also drives or moves it in a circular orbital path with reference to the centerline of the spindle and the machine.

Figure 8:
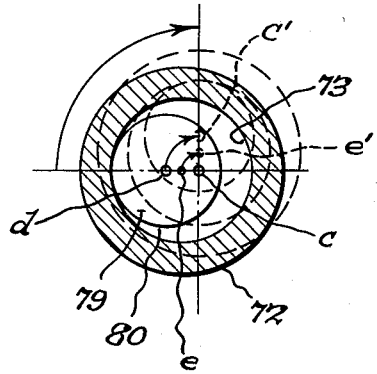
FIG. 8 is a diagrammatic representation of the movement of the honing tool and workpiece with reference to the honing apparatus.
Figure 7:
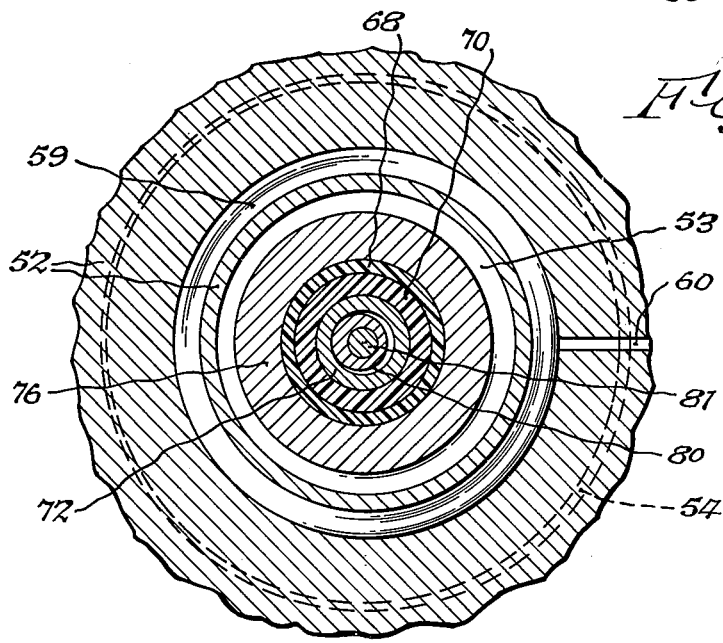

Referring to FIG. 8, as the tool 72 moves 90° about the axis c of the spindle 82, the eccentric axis d of the tool 79 is moved, say, from the position illustrated by full lines in FIG. 8 to the position c' illustrated by dotted lines in this figure. By reason of the frictional engagement of the periphery 80 of the tool 72 with the bore 73 of the workpiece, the axis e moves from the full line position shown in FIG. 8 to the dotted line position e' shown in this figure. As a consequence the workpiece 72 is gyrated by frictional contact with the rotating tool 79 but by virtue of the eccentric mounting for the tool 79, the axis of the workpiece 72 gyrates in a circular path about and equidistant from the major axis c of the honing machine.

The frictional resistance to this orbital movement of the workpiece is translated into the effective friction and honing action of the tool 72 against the bore of the workpiece, increased friction resulting in increased but coarser honing action of the tool and decreased friction resulting in decreased but finer or more polishing honing action. Accordingly, if the cutting action is insufficient, the operator adjusts the air pressure valve 63 to increase the pressure against the top of the quad-ring 59 and thereby, through the follower 58 to impress downward pressure against the flange 48 of the chuck 46 and increase its frictional resistance against the top 49 of the holder to increase the impedance to the orbital movement of the chuck and workpiece 72 and render the cutting or honing action of the tool 79 more effective. Conversely, if too rapid honing and undesirable scoring is being encountered, the air pressure valve 63 is adjusted to reduce the downward air pressure against the quad-ring 59, follower 58 and flange 48 of the chuck 46 thereby to decrease the frictional resistance against the bottom of the chuck flange and decrease the impedance to orbital movement of the workpiece and chuck by the eccentric tool.

After the coarse finishing has been completed, the pan 22 is replaced by the pan 23 and the switch 96 is thrown in the direction to disengage its movable contact from the fixed contact 95 and to engage it with the fixed contact 94. The above described steps are then repeated, the only difference being that the motor 33 for the coarse diamond dust slurry pump 32 is deenergized and the motor 41 for the pump 40 energized to supply fine abrasive particle slurry through the circuit comprising the pump outlet line 42, nozzle 43, bore 73 of workpiece 72, pan 23 and drain pipe 36 to the sump 38 for the pump 40.

It will be apparent, of course, that the invention can be employed for external honing as will be apparent from an inspection of FIGS. 9 and 10. Thus the chuck 46a is distinguished from the chuck 46 of the form of the invention shown in FIGS. 1–8 by having a bottom wall 100 to which the workpiece 72a can be secured in concentric relation to the chuck, as by a screw joint 101. The external cylindrical surface of the workpiece 72a to be honed is indicated at 102 and holes 103 are provided in the bottom wall 100 to permit the watery slurry of abrasive particles to escape. As with the chuck 46, the chuck 46a has a radially outwardly extending annular flange 48a and this is frictionally held against the flat top face 49 of the workpiece holder 26 by the retaining ring 50 described in detail in conjunction with the form of the invention illustrated in FIGS. 1–8.

The tool 79a is distinguished by being in the form of a rectangular block 104 of any suitable material, as rubber, carbon, Teflon, felt, nylon or abrasive material, pivoted, as at 105, to a stem 106 having an attaching portion 108 secured concentrically in the lower end of the spindle 82. It will be seen that the action of the form of the invention shown in FIGS. 9 and 10 is exactly the same as with the form of the invention shown in FIGS. 1–8 except that the tool 79a acts externally on the workpiece 72a instead of internally as with the tool 79 and workpiece 72 of the form of the invention illustrated in FIGS. 1–8.

It is apparent that forces other than air pressure can be used to adjust the frictional resistance to the movement of the chuck and hence the honing action of the tool and in FIGS. 11 and 12 is illustrated a permanent magnet for accomplishing this purpose. With this modification of the invention the chuck 46b is distinguished from the chuck 46 of the form of the invention shown in FIGS. 1–8 by having its horizontally outwardly extending flange 48b made of soft steel or the like so as to respond to magnetic influences. As with the form of the invention shown in FIGS. 1–8 the bottom face 48b of the chuck is held against the flat top face 49b of the workpiece holder 26b by a retaining ring 50b secured to the face 49b by screws 51b and this ring is provided with a radial inward extension 52b which overhangs or overlays the flange 48b and has an under face, clearance 54b being left around the periphery of this flange 48b to permit unobstructed orbital movement of the latter. In short, the ring 50b represents the ring 50 of the form of the invention shown in FIGS. 1–8 stripped of its air passages, quad ring and follower.

The holder 26b is also similar to the holder 26 of the form of the invention shown in FIGS. 1–8 except that the hole 45b therethrough is internally threaded as indicated at 110 and in this holder is adjustably screwed the externally threaded neck 111 of a non-ferrous or non-magnetic ring 112 for adjusting the freedom of orbital action of the chuck 46b. For this purpose the ring 112 is provided at its lower end with an outwardly extending hand wheel 113 which can be calibrated as indicated at 114 and is also provided at its lower end with a radially inwardly extending annular flange 115 which is also internally threaded. On this externally threaded flange 115 is screwed a non-magnetic collar 116 which extends upwardly therefrom and has a radially upwardly projecting flange 118 at its upper end. This flange 118 fits against the top of the ring 112 and forms an annular chamber 119 containing an annular permanent magnet 117 shown in perspective in FIG. 13.

This permanent magnet is preferably of the high energy type and is shown as made of sintered metal and formed to provide a series of upwardly extending pole pieces 121, these pole pieces alternately being of opposite polarity. This magnet is placed in the chamber 119 and the collar 116 tightened so as to secure it firmly in position with its pole pieces 121 opposing the soft steel flange 48b of the chuck 46b.

The effect of the permanent magnet 117 in drawing the soft steel flange 40b into contact with the top face 49b of the holder 26b is, of course, dependent upon the distance of the magnet 117 from this soft steel flange, the parts being shown in their maximum position of adjustment in FIG. 9. Accordingly, by turning the hand wheel 113 so as to unscrew the permanent magnet holder ring 112, the ring-shaped magnet 117 is drawn away from the flange 48b so as to have less effect upon this flange and hence reduce the frictional resistance between its underface and the top face 49b of the holder 26b. Accordingly, by this arrangement, it will be seen that the horizontal movement in a horizontal plane of the chuck 46b can be accurately adjusted in the same manner as by the air pressure control with the form of the invention shown in FIGS. 1–8. It will further be seen that permanent magnet in the form of the invention shown in FIGS. 11 and 12 is completely encased and hence not subject to weakening through being mechanically struck or injured.

In FIGS. 13–17 is illustrated an abrasive tool having a number of distinctive features as compared with the tools 79 or 79a previously described. While the tool, indicated generally at 79b, is shown as designed for internal finishing of a workpiece, it will be understood that features of the invention embodied in this tool can be also adapted for external finishing of the workpiece as with the tool 79a, FIGS. 9 and 10.

The modified tool 79b shown in FIGS. 13–17 is shown as comprising a Morse taper pin 120 conventionally secured in and projecting downwardly from the spindle 82. This pin 120 is provided with a cylindrical lower end 121 of reduced diameter and which extends up to an enlarged annular integral collar or shoulder 122 projecting radially outwardly from the pin 120 at the lower end of the taper thereof. Spaced a short distance above this collar or shoulder 122 the Morse taper pin 120 is provided with an annular external groove 123 adapted to receive and retain a snap ring 124 the body of which projects outwardly to provide a removable stop shoulder as hereinafter described. The cylindrical lower end 121 is bicurcated by a transverse medial end slot 125 having flat opposing parallel vertical side walls or faces 126 to provide ends 121a and 121b. The through slot 125 is continued upwardly to the groove 123 by a keyhole slot 128.

The abrasive stone or other body is shown as being in the form of a block 130 having a vertical working face 131 at one edge, a back face with its upper part 132 inclining upwardly in converging relation to the working face 131 for a purpose which will presently appear, and parallel vertical side faces 133 which are in closely spaced relation to the opposing side faces 126 of the slot 125, the spaces between these faces being occupied by a coating 134 of nylon or the like and which can also cover the top, bottom and back faces of the block or stone 130, leaving only the working face 131 bare. A horizontal pin 135 fixed centrally in the block 130 to have its opposite ends project transversely therefrom.

These ends fit in horizontal slots 138 extending inwardly from corresponding vertical edges 139 of the bifurcations 121a and 121b of the pin 120, these horizontal slots being in horizontal alinement with each other and the vertical edges 139 being those from which the working face part of the block 130 projects.

A sleeve 140 slidingly fits over the bifurcated cylindrical bottom extension 121 of the Morse taper pin 120. At opposite sides this sleeve has counterpart horizontally alining slots 141 extending upwardly from the bottom thereof and at an angle with reference to the axis of the sleeve, these two having a common plane diverging downwardly with reference to the axis of the sleeve toward one side of the sleeve. This one side is cut away, as indicated at 142, to expose one side of the bore of the sleeve as a slot through which the working face part of the block 130 projects as best shown in FIGS. 15 and 16.

The upper end of the sleeve 140 is in the form of an enlarged externally threaded cylindrical neck 143 which is spaceed downwardly from the shoulder 122 suciently far to permit the pin 135 to be inserted into the grooves 138 and 141 and to permit thereafter progressively adjusting the sleeve 140 upwardly in progressively extending the working face 131 of the block as wear takes place. This adjustment is effected by a screw collar 144 screwed on the threaded upper end 143 of the sleeve 140 and having a radially inwardly projecting flange 145 rotatably fitted between the annular shoulder 122 and snap ring 124 of the Morse taper pin 120.

When mounted in the same manner as the tools 79 and 79a, the operation of the tool 79b is as follows:

As the working face 131 of the block or body 130 is brought into working contact with the bore to be honed, the stone pivots about the pin 135 as an axis, this pin being rotatable in the two sets of grooves 138 and 141. This permits the working face of the stone to adapt itself to full surface contact with the surface being honed. At the same time the flat guide faces 126 of the pin 120 are not ground away by the abrasive of the body and watery abrasive slurry because of the protecting layer 134 of nylon. As the stone wears, the knurled screw sleeve 144 is turned in the direction to move the sleeve 140 upwardly. Through the inclined slots 141 in the bottom of this sleeve this forces the ends of the cross pin 135 horizontally outwardly transversely of its axis, thereby to project the working face 131 of the block to take up the wear. This adjustment of the screw collar 144 is illustrated in FIG. 17 and is repated until the block is used up at which time its cross pin 135 is in the lower extremity of the grooves 141 and at the outer extremity of the grooves 138 following which a little more turning of the knurled screw sleeve 144 in the same direction releases the pin from both sets of grooves and permits the replacement with the pin of a fresh block. Following this the knurled sleeve 144 is of course, turned in the reverse direction to reset the fresh block in its fully retracted position.

From the foregoing, it will be seen that the various forms of the invention illustrated provide a microfinish honing apparatus achieving the objects set forth.

What is claimed is:

1. A machine for honing a circular surface of a workpiece, comprising a base, a workpiece holding member, a tool member arranged with its working face engageable with said circular surface of said workpiece, means on said base rotating one of said members about an axis which is generally parallel with and eccentric to the axis of said circular surface of said workpiece, and means on said base permitting orbital movement of the other member about said axes whereby said other member is rotated and moved in an orbital path through motion derived from the frictional engagement of said face and surface.

2. A machine for honing a circular surface of a workpiece, comprising a base, a workpiece holding member, a tool member arranged with its working face engageable with said circular surface of said workpiece, means on said base rotating one of said members about an axis which is generally parallel with and eccentric to the axis of said circular surface of said workpiece, and means on said base constraining the other member to move in a plane substantially perpendicular to said parallel axes and permitting orbital movement in said plane of said other member, whereby said other member is rotated and moved in an orbital path through motion derived from the frictional engagement of said face and surface.

3. A honing machine as set forth in claim 2 additionally including means adjustably restraining said orbital movement of said other member to vary said frictional engagement and the cutting action of said tool face.

4. A honing machine as set forth in claim 2 additionally including hydraulic pressure means arranged to restrain said orbital movement of said other member, and means adjusting the effect of said hydraulic pressure means to vary said frictional engagement and the cutting action of said tool face.

5. A honing machine as set forth in claim 2 additionally including magnetic means arranged to restrain said orbital movement of said other member, and means adjusting the effect of said magnetic means to vary said frictional engagement and the cutting action of said tool face.

6. A machine for honing a workpiece having a circular surface concentric with a vertical axis comprising a fixed support having an upwardly facing surface, a workpiece holder slidably supported on said surface of said fixed support, a tool having its working face engageable with said circular surface of said workpiece, means supporting said tool and rotating said tool about a vertical axis eccentric to said first mentioned axis, and means adjustably varying the downward pressure of said workpiece holder on said fixed support to adjust the frictional restraint imposed by said workpiece holder on said surface of said fixed support thereby to adjust the frictional engagement and the cutting action of said tool face in effecting horizontal orbital movement of said workpiece and workpiece holder.

7. A machine for honing a workpiece having a circular surface concentric with a vertical axis, comprising a fixed support having an upwardly facing horizontal surface surrounding a depression in the fixed support, a workpiece holder having an annular horizontal flange projecting outwardly from a body portion and slidingly mounted on said surface of said fixed support with said body portion arranged in and movable orbitally in said depression, a tool having its working face engageable with said circular surface of said workpiece, means supporting said tool in said holder and rotating said tool about a vertical axis eccentric to said first mentioned axis, and means adjustably varying downward pressure against said flange to adjust the frictional restraint imposed by said flange on said surface of said fixed support thereby to adjust the frictional engagement and the cutting action of said tool face in effecting horizontal orbital movement of said workpiece and workpiece holder.

8. A machine for honing a workpiece having a circular surface concentric with a vertical axis, comprising a fixed support having an upwardly facing horizontal surface surrounding a depression in the fixed support, a workpiece holder having an annular horizontal flange projecting outwardly from a body portion and slidingly mounted on said surface of said fixed support with said body portion arranged in and movable orbitally in said depression, a tool having its working face engageable with said circular surface of said workpiece, means supporting said tool in said holder and rotating said tool about a vertical axis eccentric to said first mentioned axis, a generally concentric ring slidingly engaging the upper surface of said annular flange, and means adjustably varying the downward pressure of said ring against said flange to adjust the frictional restraint imposed by said flange on said surface of said fixed support thereby to adjust the frictional engagement and the cutting action of said tool face in effecting horizontal orbital movement of said workpiece and workpiece holder.

9. A machine for honing a workpiece having a circular surface concentric with a vertical axis, comprising a fixed support having an upwardly facing horizontal surface surrounding a depression in the fixed support, a workpiece holder having an annular horizontal flange projecting outwardly from a body portion and slidingly mounted on said surface of said fixed support with said body portion arranged in and movable orbitally in said depression, a tool having its working face engageable with said circular surface of said workpiece, means supporting said tool in said holder and rotating said tool about a vertical axis eccentric to said first mentioned axis, said annular flange including a metal having a high degree of magnetic permeability, magnet means below said flange, and means adjustably varying the effect of said magnet means on said metal to adjust the frictional restraint imposed by said flange on said surface of said fixed support thereby to adjust the frictional engagement and the cutting action of said tool face in effecting horizontal orbital movement of said workpiece and workpiece holder.

10. In a honing machine having a base, a standard rising from said base, a workpiece holder above said base carried by said standard, and a tool carried by said standard in position to work on a workpiece on said workpiece holder; the combination therewith of means selectively supplying different streams of liquid to said workpiece holder comprising a first sump in said bed, a first liquid pump having its inlet connected to said first sump, a first outlet line connected with the outlet of said first pump and discharging against said workpiece holder, a first pan mounted on said bed in position to catch liquid from said workpiece holder, a drain for said first pan leading to said first sump, a second sump in said bed, a second liquid pump having its inlet connected to said second sump, a second outlet line connected with the outlet of said second pump and discharging against said workpiece holder, a second pan adapted to be substituted in position on said bed for said first pan to catch liquid from said workpiece holder, and a drain for said second pan leading to said second sump.

11. A holder for a workpiece having inner and outer concentric cylindrical surfaces one of which is to be honed, comprising a first tube of resilient organic plastic material having concentric frusto-conical and cylindrical faces, the latter being in surface contact with the other cylindrical surface of said workpiece, a second tube of resilient organic plastic material having concentric cylindrical and frusto-conical faces, the latter being in surface contact with the frusto-conical face of said first tube, a metal cylinder having one end engaging one end of said second tube and having a cylindrical surface in surface contact with the cylindrical face of said second tube, and a member adjustably connected with said metal cylinder for adjustment axially thereof and engageable with the end of said first tube opposite from said one end of said metal cylinder to move said tubes axially with reference to each other to grip said workpiece.

References Cited in the file of this patent

UNITED STATES PATENTS

| | | |
|---|---|---|
| 2,778,167 | Klumpp | Jan. 22, 1957 |
| 2,829,470 | Johnson | Apr. 8, 1958 |
| 2,981,037 | Terp | Apr. 25, 1961 |
| 2,988,859 | Chaffey | June 20, 1961 |
| 3,024,575 | Drieling | Mar. 13, 1962 |
| 3,029,562 | Kroen | Apr. 17, 1962 |
| 3,044,220 | Emerson | July 17, 1962 |